US007549589B2

(12) United States Patent
Sakoguchi

(10) Patent No.: US 7,549,589 B2
(45) Date of Patent: Jun. 23, 2009

(54) CARD PROCESSING SYSTEM

(75) Inventor: Yoshitaka Sakoguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 116 days.

(21) Appl. No.: 11/657,581

(22) Filed: Jan. 25, 2007

(65) Prior Publication Data

US 2007/0176005 A1 Aug. 2, 2007

(30) Foreign Application Priority Data

Jan. 27, 2006 (JP) ............................ 2006-019671

(51) Int. Cl.
*G06K 7/00* (2006.01)

(52) U.S. Cl. ...................................................... 235/486

(58) Field of Classification Search ................. 235/486; *G07D 7/04, 7/12, 9/04, 2/00; G06K 7/00*
See application file for complete search history.

(56) References Cited

U.S. PATENT DOCUMENTS

2005/0045448 A1 3/2005 Sugano et al.
2005/0060055 A1 3/2005 Hallowell et al.

FOREIGN PATENT DOCUMENTS

| | | | |
|---|---|---|---|
| DE | 29705210 | U1 | 7/1997 |
| EP | 1544807 | A2 | 6/2005 |
| JP | 2004-240778 | | 8/2004 |
| WO | WO 03/046845 | | 6/2003 |

OTHER PUBLICATIONS

European Search Report dated Feb. 3, 2009 for Appln. No. 07000028.6-1229.

*Primary Examiner*—Tung S Lau
*Assistant Examiner*—Laura Gudorf
(74) *Attorney, Agent, or Firm*—Pillsbury Winthrop Shaw Pittman, LLP

(57) ABSTRACT

A card processing system comprises an input section for inputting extraction information of a ticket to be extracted from a storage box and a control section for specifying the storage box storing the ticket carrying identification information which corresponds to the extraction information input at the input section according to the barcode information of the ticket, the cassette information of the corresponding cassette and the barcode information of the storage box associated and stored in a memory section.

8 Claims, 5 Drawing Sheets

CARD PROCESSING SYSTEM

CROSS-REFERENCE TO RELATED APPLICATIONS

This application is based upon and claims the benefit of priority from prior Japanese Patent Application No. 2006-019671, filed Jan. 27, 2006, the entire contents of which are incorporated herein by reference.

BACKGROUND OF THE INVENTION

1. Field of the Invention

This invention relates to a card processing system for processing cards, or tickets, to be used for slot machines in casinos or some other slips.

2. Description of the Related Art

Slot machines installed in casinos are played by players as the player throws in a coin and operates the operation lever of the machine. A ticket is issued from the sot machine according to the score that the player gets.

The issued ticket is cashed at the cash desk and collected by the cashier. The collected tickets are processed by a card processing machine. More specifically, the tickets are put into the card processing machine, discriminated by a discriminating section of the machine and counted. Subsequently, the barcode of each ticket is read by a barcode reader and tickets are accumulated in a plurality of accumulating sections of the machine according to the results of discrimination at the discriminating section (see, inter alia, Jpn. Pat. Appln. Publication No. 2004-240778).

Each of the plurality of accumulating sections includes a temporary accumulating section and a cassette for containing the tickets accumulated in the temporary accumulating section. As the cassette becomes full, it is taken out from the card processing machine and the tickets in the cassette are drawn out by the operator. The drawn out tickets are stored in a storage box. Normally, there may be a number of storage boxes.

Meanwhile, the tickets stored in the storage boxes may include one or more than one forged tickets.

In order to check the one or more than one forged tickets, the stored tickets are drawn out from the storage boxes and reprocessed by the card processing machine so that the one or more than one forged tickets may be extracted.

However, conventionally, all the tickets in the storage boxes have to be taken out and reprocessed by the card processing machine to extract a forged ticket. It is a very time consuming operation.

BRIEF SUMMARY OF THE INVENTION

In view of the above identified circumstances, it is therefore the object of the present invention to provide a card processing system that does not require all the cards stored in the storage containers to be taken out and can extract only a specified card.

In an aspect of the present invention, the above object is achieved by providing a card processing system comprising: a card processing apparatus including: a conveyance device for conveying a plurality of cards carrying identification information; a discrimination device for discriminating the cards conveyed by the conveyance device; a reading device for reading the identification information of the cards discriminated by the discrimination device; and a plurality of cassettes for sorting and containing the cards according to the results of discrimination of the discrimination device; an external reading device for reading the identification information of a plurality of storage containers storing the cards taken out from the plurality of cassettes and carrying the identification information; a memory device for storing the identification information of the cards read by the reading device, the information of the cassettes storing the cards carrying the read identification information and the identification information of the storage containers read by the external reading device; an input device for inputting extraction information of the card to be extracted from the storage containers; and a specification device for specifying the storage container containing the card carrying the identification information corresponding to the extraction information input by the input device according to the information stored in the memory device.

Thus, with a card processing system as defined above, the operation of extracting a card is a very easy one because it is now possible to specify the storage box storing the card to be extracted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Now, the present invention will be described in greater detail by referring to the accompanying drawing that illustrates preferred embodiments of the invention.

Figure 1:
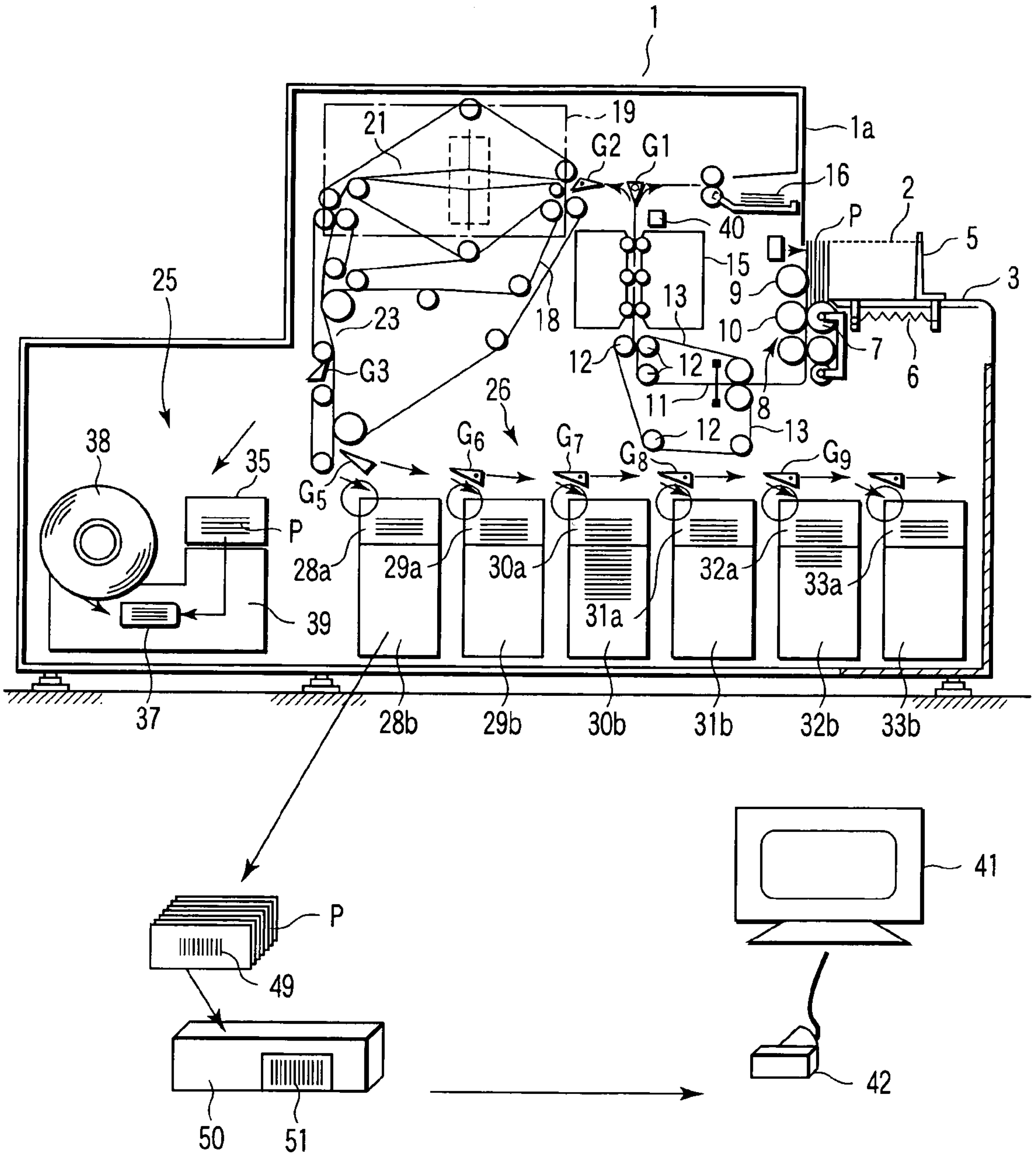
FIG. 1 is a schematic illustration of the first embodiment of card processing system according to the present invention, showing the configuration thereof.
Figure 2:
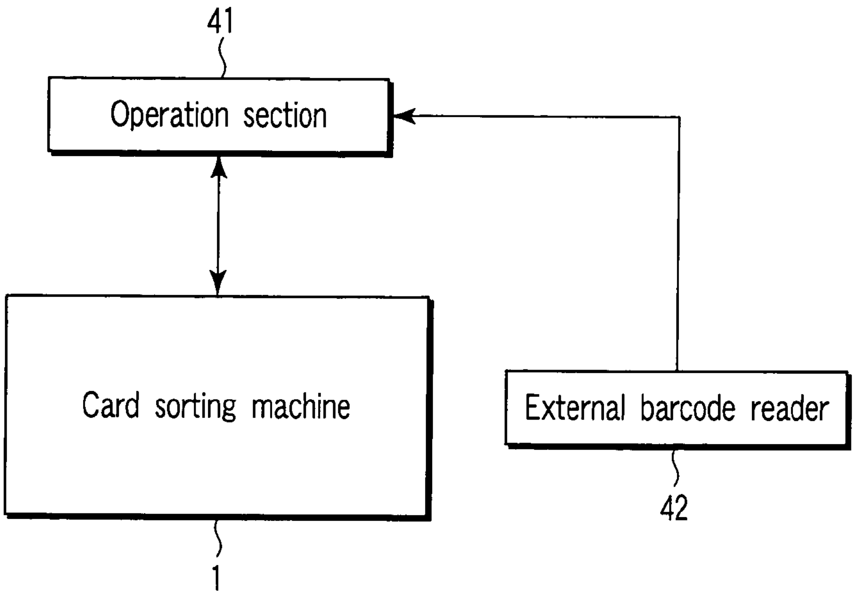
FIG. 2 is a schematic block diagram of the card processing system of FIG. 1.

FIG. 1 is a schematic illustration of the first embodiment of card processing system according to the present invention, showing the configuration thereof and FIG. 2 is a schematic block diagram of the card processing system of FIG. 1.

Referring to FIGS. 1 and 2, the card processing system comprises a cards sorting machine 1, an operation section 41 which may typically be a personal computer and an external barcode reader 42 which is an external reading device.

The cards sorting machine 1 processes cards, which may be bank notes or casino tickets (to be simply referred to as tickets hereinafter). In the following description of the embodiment, the cards sorting machine 1 is adapted to process tickets.

The cards sorting machine 1 includes an apparatus main body 1*a* which is provided at a lateral side thereof with a throw-in section 2 for throwing in a ticket P. The receiving tray 3 is arranged in the throw-in section 2 to receive a plurality of tickets thrown into the throw-in section 2 and keep them standing in it. The receiving tray 3 is equipped with a pusher plate 5 for pushing out tickets P. The pusher plate 5 is resiliently urged by a spring member 6. An intake section 8 is arranged in the direction of pushing out tickets P to take in tickets P. The intake section 8 includes a pickup roller 9, a takeout roller 10 and a separation roller 7.

The tickets P taken out by the takeout roller 10 are conveyed along the first conveyance channel 11, which is a conveyance device. The first conveyance channel 11 is formed by a plurality of rollers 12 and conveyor belts 13, 13 working around the rollers 12. A discrimination section 15 is arranged at the exit side of the conveyance channel 11 as a discrimination device for the purpose of identifying the types and the front and rear surfaces of tickets P. A barcode reader 40 is arranged at the exit side of the discrimination section 15 as a reading device for reading the barcode 49 carried by each ticket P. Note that each ticket P also carries a printed number that corresponds to the barcode.

A first switching gate G1 is arranged at the exit side of the barcode reader 40 so as to send out right tickets P in the first direction and tickets P to be rejected in the second direction. The tickets that are sent out in the second direction are collected in a reject box 16. A second switching gate G2 is arranged in the first direction to be switched by the first switching gate G1. The conveyance direction of tickets P is branched to the third direction and the fourth direction at the second switching gate G. so as to be selected by the latter. The second conveyance channel 18 is arranged in the third direction to convey tickets facing upward, whereas the third conveyance channel 21 is arranged in the fourth direction to convey tickets facing downward and turn them upside down by means of an inverting section 19.

The second conveyance channel 18 and the third conveyance channel 21 are put together at a confluence section 23. A third switching gate G3 is arranged at the ticket exit side of the confluence section 23. The third switching gate G3 switches the ticket conveying direction from a bundling section 25 to an accumulating section 26 or vice versa. A plurality of accumulation boxes 28*a* through 33*a* are arranged side by side in the accumulating section 26. Cassettes 28*b* through 33*b* are arranged respectively under the plurality of accumulation boxes 28*a* through 33*a*, whereas fifth through ninth switching gates G5 through G9 are arranged above the plurality of accumulation boxes 28*a* through 33*a* in order to selectively guide tickets to the accumulation boxes 28*a* through 33*a* according to the types of the tickets.

The bundling section 25 is operated when processing bank notes. The bundling section 25 is provided with an accumulation box 35 and a conveyance mechanism 39 is arranged below the accumulation box 35 in order to convey the bank notes accumulated in the accumulation box 35 to bundling position 37. A supply reel 38 for feeding out a bundling tape is arranged near the bundling position 37.

Figure 3:
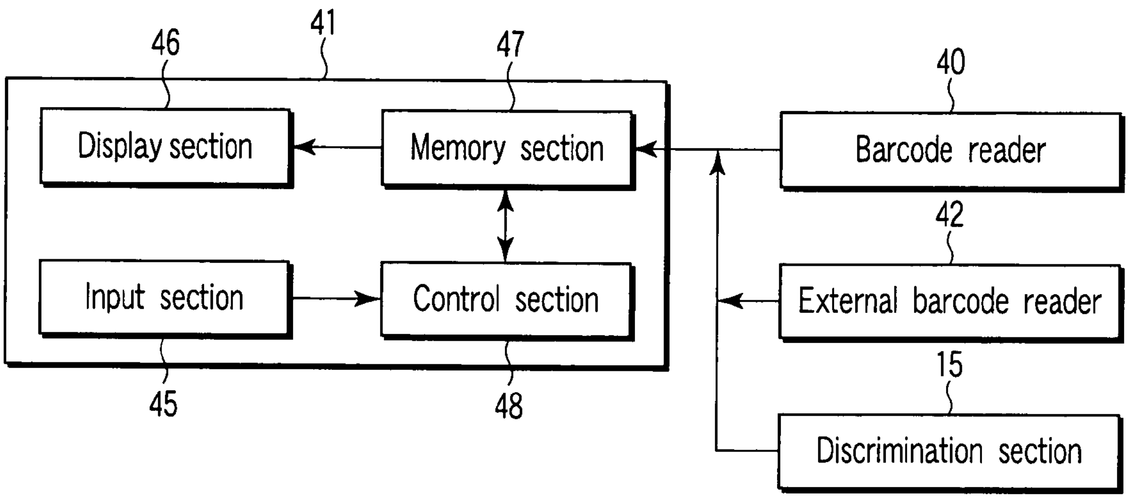
FIG. 3 is a schematic block diagram of the operation section of the card processing system of FIG. 1.

FIG. 3 is a schematic block diagram of the operation section 41 of the card processing system of FIG. 1.

The operation section 41 includes an input section 45 which is an input device, a display section 46, a memory section 47 which is a memory device and a control section 48 which is a specification device.

The memory section 47 is connected to the discrimination section 15 in the cards sorting machine 1 by way of a transmission circuit. The discrimination section 15 determines the cassette where each discriminated ticket is to be contained and information on the determined cassette is transmitted to and stored in the memory section 47.

The memory section 47 is connected to the above described barcode reader 40 in the cards sorting machine 1 by way of a transmission circuit. The information on the barcode read by the barcode reader 40 and the order of reading it are transmitted and stored.

The memory section 47 is also connected to an external barcode reader 42 by way of a transmission circuit. As shown in FIG. 1, the external barcode reader 42 is typically adapted to read the barcode 51 on a storage box (storage container) 50 as shown in FIG. 1 and transmits the read information to the memory section 47.

The memory section 47 stores and holds the barcode information of the ticket P read by the barcode reader 40, the information on the cassette storing the ticket P and the identification information of the storage box for storing the ticket P taken out from the cassette in association with each other. The memory section 47 also sores the arrangement information of the tickets stored in the cassette.

Figure 4:
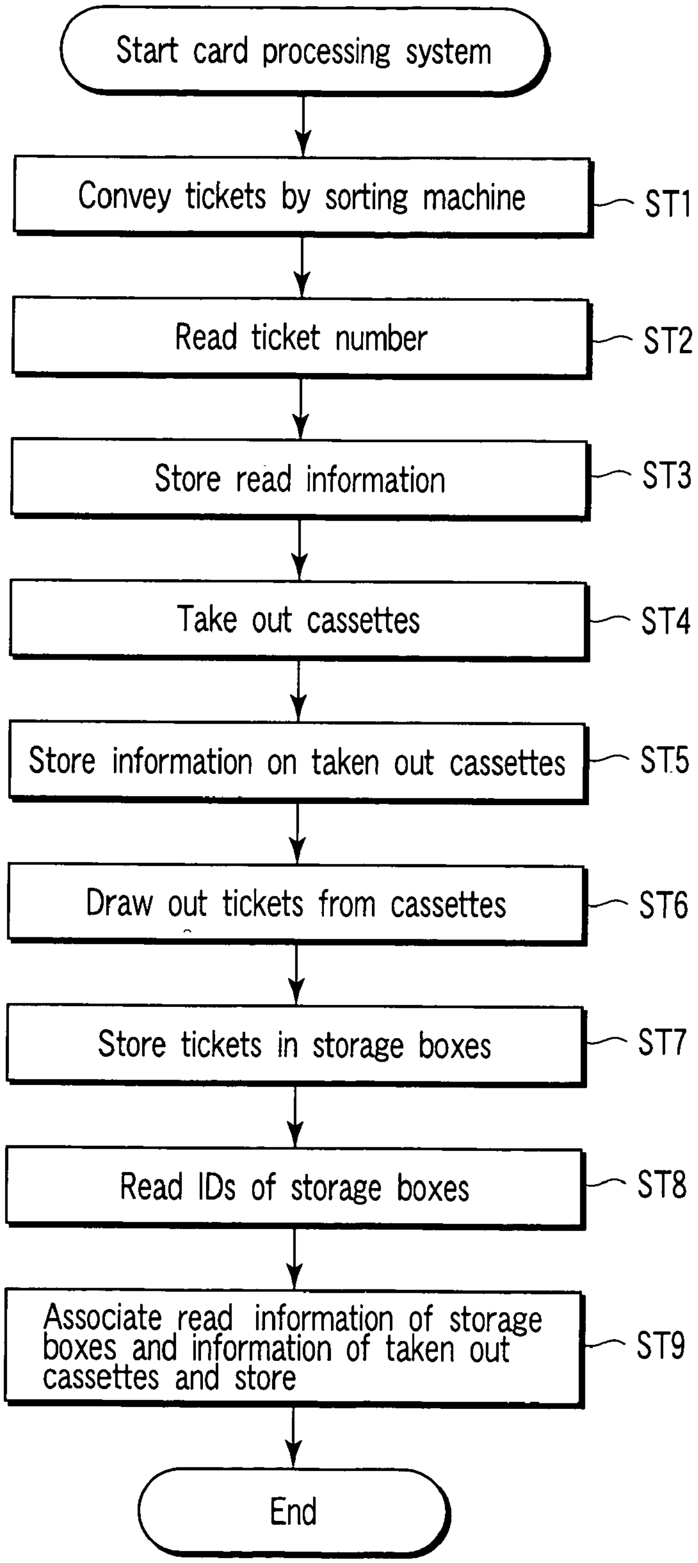
FIG. 4 is a flowchart of the processing operation of the card processing system of FIG. 1.

Now, the processing operation of the above described card processing system will be described below by referring to the flow chart of FIG. 4.

As a player plays a slot machine in a casino, a ticket is issued from the slot machine according to the results of the play. The player receives the ticket and cashes it at a cash desk. The ticket collected at the cash desk is put into the receiving tray 3 of the throw-in section 2 in a standing posture and processed. The tickets P in the receiving tray 3 are taken in one by one as the pickup roller 9, the takeout roller 10 and separation roller 7 of the intake section 8 rotate and fed and conveyed (Step ST1). The tickets P are then sent to the discrimination section 15 by way of the conveyance channel 11 for discrimination. Each ticket P is discriminated for right or forged as a result of the discriminating operation and, if the ticket is identified as right ticket, the cassette 28*b* (through 33) for storing the ticket which is identified as right ticket is determined. Information on the determined cassette is transmitted to the memory section 47 of the operation section 41 by way of a transmission circuit and stored in it. The ticket P that passes the discrimination section 15 is read by the barcode reader 40 for the barcode thereof (Step ST2) and the read information and the reading order are transmitted to the memory section 47 of the operation section 41 by way of a transmission circuit and stored in it (Step ST3).

If the ticket is identified as a ticket to be rejected by the discrimination section 15, it is sent to the reject box 16 by way of the first switching gate G1. If the ticket is identified as a right ticket which does not need to be turned upside down by the discrimination section 15 is conveyed to the second conveyance channel 18 by way of the second switching gate G2 and conveyed further. The ticket is identified as a right ticket which needs to be turned upside down by the discrimination section 15 is conveyed to the third conveyance channel 21 by way of the second switching gate G2 and conveyed further. Then, right tickets are made to pass the confluence section 23 and conveyed toward the third switching gate G3. The tickets are then conveyed toward the accumulating section 26 by the switching operation of the third switching gate G3 and sorted and accumulated in the accumulation boxes 28*a* through 33*a* according to the types of the tickets by the switching operations of the switching gates G5 through G9. When a predetermined number of tickets are accumulated in the accumulation boxes 28*a* through 33*a*, the accumulated tickets of the boxes are pushed into the respective cassettes 28*b* through 33*b* by a push-in mechanism (not shown) and contained there.

When one of the cassettes 28*b* through 33*b*, the cassette 28*b*, for instance, becomes full, the cassette 28*b* is taken out to the outside according to a command from the operation section 41 (Step ST4). Information on the taken out cassette 28*b* is stored in the memory section 47 of the operation section 41 (Step ST5). The operator draws out the tickets from the taken out cassette 28*b* (Step ST6) and stores them in a storage box 50, keeping the order of arrangement of the ticket (Step ST7). The external barcode reader 42 reads the barcode 51 of the storage box 50 (Step ST8). The information read by the barcode reader 42 is associated with the information of the taken cassette 28*b* and stored in the memory section 47 of the operation section 41 (Step S9).

When, on the other hand, the cassette 29*b* becomes full of tickets, it is taken out as in the above described case of the cassette 28*b* and the tickets in the cassette 29*b* are drawn out and stored in another storage box.

Meanwhile, the tickets stored in a plurality of storage boxes may include one or more than one forged tickets. Therefore, an extracting operation is conducted frequently in order to identify forged targets.

The number of each forged ticket which is detected is transmitted from a host computer to the operation section 1.

Figure 5:
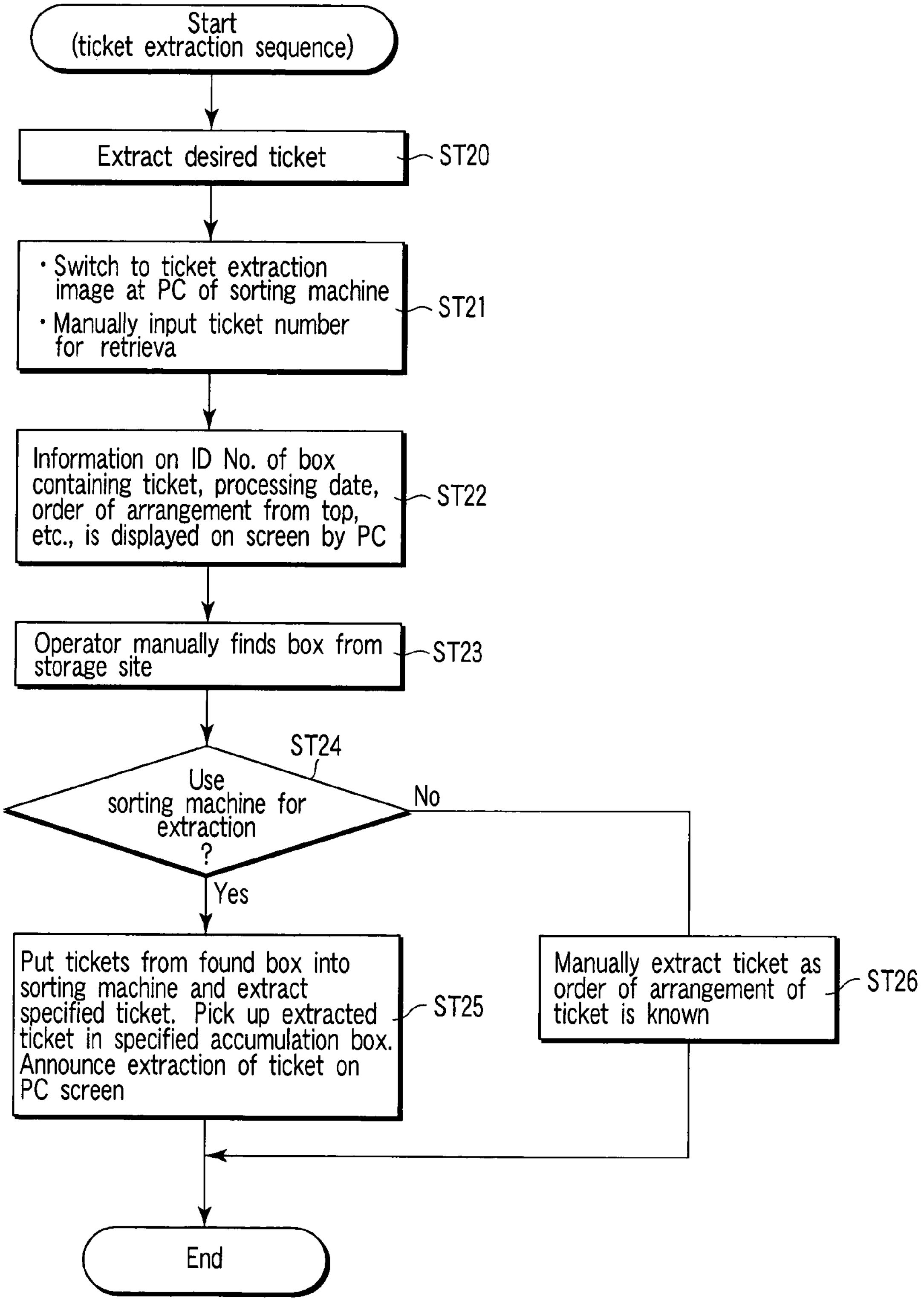
FIG. 5 is a flow chart of the ticket extracting operation of the card processing system of FIG. 1.

Now, the operation of extracting a forged ticket will be described below by referring to the flow chart of FIG. 5.

Firstly, when the ticket number of a forged ticket is transmitted from a host computer and the forged ticket carrying the transmitted ticket number has to be extracted (Step ST20), the operator switches the display section 46 of the operation section (PC) 41 to a ticket extraction image and manually inputs the ticket number of the ticket to be extracted to the input section 45 for retrieval (Step ST21).

The control section 48 identifies the cassette storing the ticket carrying the input ticket number from the memory section 47 according to the input information. Then, the control section 48 retrieves the storage box storing the ticket drawn out from the identified cassette and displays the box number, the date of processing of the ticket, the order of arrangement of the ticket from the top and other pieces of information on the display section 46 (Step ST22). Then, the operator finds out the storage box carrying the box number displayed on the display section 46 (Step ST23) and draws out the tickets from the found out storage box. Thereafter, the operator judges if the forged ticket is to be extracted from the drawn out tickets by means of the card sorting machine 1 or not (Step S24). When the cards sorting machine 1 is operated, the drawn out tickets are put into the cards sorting machine 1 and reprocessed to extract the forged ticket. The extracted ticket is stored in the specified accumulation box, e.g. the accumulation box 28*a* and the fact that the ticket is extracted is displayed on the display section 46 (Step S25). When it is judged by the operator in Step ST24 that the cards sorting machine 1 is not to be operated, the operator manually detects the forged ticket and extracts it (Step ST26). Since the order of arrangement of the forged ticket in the storage box is displayed on the display section 46, the operator can manually detect the forged ticket and extract it without difficulty.

Since the order of arrangement of the forged ticket in the storage box is known, a bunch of tickets which may highly probably include the forged ticket may be drawn out from the storage box and the drawn out bunch of tickets may be put into the cards sorting machine 1 to process them and extract the forged ticket. With such an operation, the time required for the extracting operation can be reduced further.

As described above, with this embodiment, it is possible to identify the storage box containing a specified ticket by inputting the ticket number of the specified ticket to the input section 45 of the operation section 41 for retrieval.

Thus, it is no longer necessary to draw out all the tickets from all the storage boxes and reprocess them. In other words, it is only necessary to draw out the tickets of a specified storage box and reprocess them by means of a cards sorting machine 1 to make the operation of extracting the specified ticket a very easy one.

Additionally, since the order of arrangement of the specified ticket in the storage box is also known, the specified ticket may be extracted manually or a bunch of tickets which may highly probably include the specified ticket may be drawn out and reprocessed by means of a cards sorting machine 1 to further facilitate the ticket extracting operation.

The storage boxes may not necessarily carry respective barcodes as identification information. Alternatively, serial numbers may be respectively assigned to the storage boxes and the relationship between each of the storage boxes and the tickets contained in it may be managed by inputting the serial numbers of the storage boxes.

Applications of this embodiment are not limited to casinos. It can be applied to any cards to be managed when each of the cards carries its own identification information (magnetic data, IC data, a two-dimensional barcode or the like).

Figure 6:
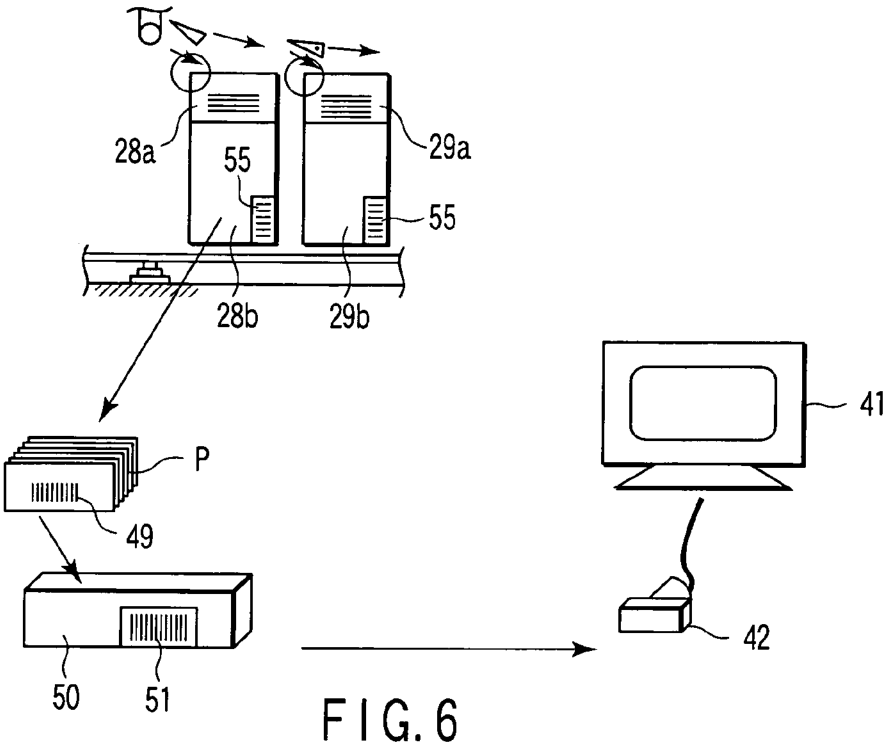
FIG. 6 is a schematic illustration of the second embodiment of card processing system according to the present invention.

FIG. 6 is a schematic illustration of the second embodiment of card processing system according to the present invention.

In FIG. 6, the components of the second embodiment same as or similar to those of the first embodiment are denoted respectively by the same reference symbols and will not be described any further.

In the second embodiment, the cassettes 28*b* through 33*b* are made to carry respective barcodes 55 as identification information so as to be read by the external barcode reader 42. The information on the barcode read by the external barcode reader 42 is transmitted to the memory section 47 of the operation section 41 and stored in it. The tickets in the cassette whose barcode 55 is read, for instance, are drawn out from the cassette 28*b* and stored in a storage box 50. The barcode 51 of the storage box 50 storing the tickets is read by the external barcode reader 42 as identification information of the storage box 50. The barcode information read by the external barcode reader 42 is transmitted to the memory section 47 of the operation section 41 and stored in it. The storage section 47 stores the barcode information of the cassette 28*b* and that of the storage box 50 in association with each other.

Thus, with the second embodiment for providing each cassette with identification information typically in the form of a barcode, it is possible to identify the storage box storing a specified ticket if the cards sorting machine to be used for it is not structurally adapted to draw out cassettes or is structurally adapted to draw out a plurality of cassettes at a time.

While all the tickets stored in a cassette are arranged to face the same direction in the above described embodiments, the present invention is by no means limited to such an arrangement. A specified number of tickets may be stored in a cassette regardless of the direction in which each of the tickets faces.

Figure 7:
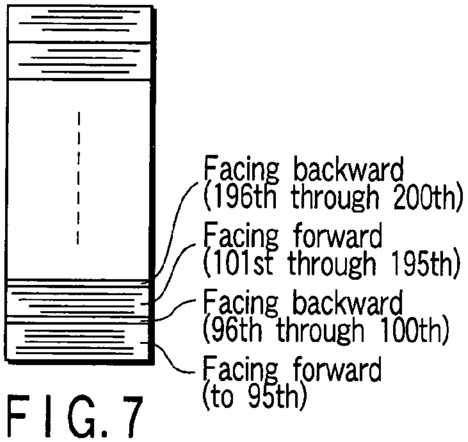
FIG. 7 is a schematic illustration of the first accumulation method of accumulating tickets in a cassette.

For example, as shown in FIG. 7, the first 95 tickets may be accumulated in a cassette with their faces directed forward and the 96th through 100th tickets may be put in the cassette with their faces directed backward, while the 101st through 195th tickets may be accumulated in the cassette with their faces directed forward and the 196th through 200th tickets may be put in the cassette with their faces directed backward to fill the cassette (with 200 tickets).

With this arrangement, if the specified ticket is the 167th ticket, the ticket can be manually extracted from the storage box with ease without extracting all the cards from the storage box and reprocessing them by the cards sorting machine 1.

Figure 8:
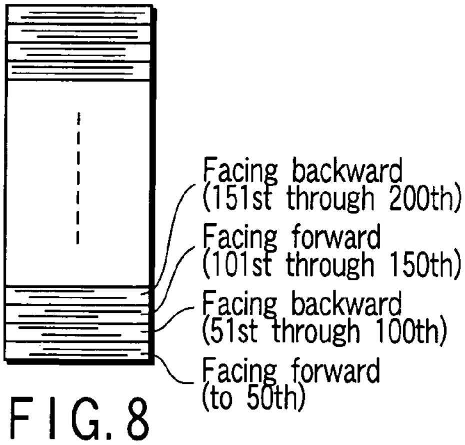
FIG. 8 is a schematic illustration of the second accumulation method of accumulating tickets in a cassette.
Figure 9:
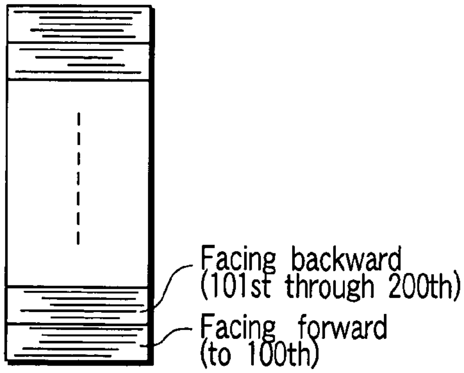
FIG. 9 is a schematic illustration of the third accumulation method of accumulating tickets in a cassette.

Alternatively, the first 50 tickets may be directed in a same direction and the second 50 tickets may be directed in the opposite direction and so on in a cassette as shown in FIG. 8 or the first 100 tickets may be accumulated in a cassette with their faces directed in a same direction and the second 100 tickets may be put in the cassette with their faces directed in the opposite direction as shown in FIG. 9. The effects of such arrangements are similar.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card processing system comprising:

a card processing apparatus including:

a conveyance device for conveying a plurality of cards carrying identification information;

a discrimination device for discriminating the cards conveyed by the conveyance device;

a reading device for reading the identification information of the cards discriminated by the discrimination device; and a plurality of cassettes for sorting and containing the cards according to the results of discrimination of the discrimination device;

a second reading device for reading the identification information of a plurality of storage containers storing the cards taken out from the plurality of cassettes and carrying the identification information;

a memory device for storing the identification information of the cards read by the reading device, the information of the cassettes storing the cards carrying the read identification information and the identification information of the storage containers read by the second reading device;

an input device for inputting extraction information of the cards to be extracted from the storage containers; and a specification device for specifying the storage container containing the cards carrying the identification information corresponding to the extraction information input by the input device according to the information stored in the memory device.

2. The system according to claim 1, wherein the identification information of the cards is the barcode printed on each of the cards.

3. The system according to claim 2, wherein the reading device is a barcode reader.

4. The system according to claim 1, wherein the identification information of the storage containers is the barcode printed on each of the storage containers.

5. The system according to claim 4, wherein the second reading device is a barcode reader.

6. The system according to claim 1, wherein the cassettes are taken out from the card processing apparatus when they become full of cards and the memory device associates the taken out cassettes and the storage containers for storing the cards taken out from the cassettes and stores information on the association.

7. The system according to claim 1, wherein the cassettes are provided with identification information and the identification information is read by the second reading device so that the memory device associates the cassettes whose identification information is read and the storage containers for storing the cards taken out from the cassettes and stores information on the association.

8. The system according to claim 1, wherein the cards are contained in each of the cassettes by turning the front sides of cards after every specified number of cards.

* * * * *